US009723465B2

(12) United States Patent
Shukla et al.

(10) Patent No.: US 9,723,465 B2
(45) Date of Patent: Aug. 1, 2017

(54) SYSTEM AND METHOD FOR RECEPTION OF CELL BROADCAST MESSAGES

(71) Applicant: APPLE INC., Cupertino, CA (US)

(72) Inventors: Umesh Shukla, Sunnyvale, CA (US); Sunny Arora, Sunnyvale, CA (US); Mohan Rao Thota, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 103 days.

(21) Appl. No.: 14/502,843

(22) Filed: Sep. 30, 2014

(65) Prior Publication Data

US 2015/0195696 A1 Jul. 9, 2015

Related U.S. Application Data

(60) Provisional application No. 61/924,512, filed on Jan. 7, 2014.

(51) Int. Cl.
*H04W 4/22* (2009.01)
*H04W 76/00* (2009.01)
*H04W 68/00* (2009.01)
*H04W 76/04* (2009.01)

(52) U.S. Cl.
CPC .......... *H04W 4/22* (2013.01); *H04W 76/007* (2013.01); *H04W 68/005* (2013.01); *H04W 76/046* (2013.01)

(58) Field of Classification Search
CPC ... H04W 4/22; H04W 76/007; H04W 68/005; H04W 76/046
See application file for complete search history.

(56) References Cited

U.S. PATENT DOCUMENTS

| 9,125,122 B2 | 9/2015 | Kodali | |
| 2010/0178895 A1* | 7/2010 | Maeda | H04W 76/007 455/404.1 |
| 2010/0233990 A1 | 9/2010 | Kitahara et al. | |
| 2014/0066107 A1* | 3/2014 | Schmidt | H04W 68/00 455/458 |
| 2014/0376429 A1 | 12/2014 | Khay-Ibbat | |

* cited by examiner

*Primary Examiner* — Chuong A Ngo
(74) *Attorney, Agent, or Firm* — Fay Kaplun & Marcin, LLP

(57) ABSTRACT

A system, station and corresponding methods for providing warning notifications. In one exemplary method, it is determined whether any of a plurality of stations to which a Warning Notification is to transmitted is in a connected state. When it is determined that a first one of the stations is in a connected state, generating, by a broadcaster, a secondary Warning Notification formatted for transmission over a dedicated control channel (DCCH) and transmitting, by the broadcaster, the secondary Warning Notification to the first station over the DCCH. In another exemplary embodiment, a station for receiving emergency notifications is described. The station includes a receiver configured to receive a primary Warning Notification; and a processor which, upon receiving the emergency alert configuration in a format of one of a Paging Type 2 message and an SICI message, despreads a plurality of fingers.

17 Claims, 6 Drawing Sheets

SYSTEM AND METHOD FOR RECEPTION OF CELL BROADCAST MESSAGES

PRIORITY CLAIM/INCORPORATION BY REFERENCE

This application claims priority to U.S. Provisional Application 61/924,512 entitled "System and Method for Reception of Cell Broadcast Messages," filed on Jan. 7, 2014, the entirety of which is incorporated herein by reference.

BACKGROUND INFORMATION

A Warning Notification may be broadcast to a plurality of stations to provide information about an event that has occurred or will occur. For example, the Warning Notification may include notice of an imminent threat, a presidential alert, an amber alert, etc. The Warning Notification may also provide instructions to users of the stations so the users are aware of what is to be done. However, the stations are generally capable of receiving the Warning Notification only when there is a specific set of conditions running on the station at the time the Warning Notification is received. In general, if a station is not in a lower power state and performing nothing other than listening for a page (which is the format in which the Warning Notification is broadcast), it will be incapable of receiving the Warning Notification.

SUMMARY

In one exemplary embodiment, a method includes determining whether any of a plurality of stations to which a Warning Notification is to transmitted is in a connected state, when it is determined that a first one of the stations is in a connected state, generating, by a broadcaster, a secondary Warning Notification formatted for transmission over a dedicated control channel (DCCH) and transmitting, by the broadcaster, the secondary Warning Notification to the first station over the DCCH.

In a further exemplary embodiment, a system for transmitting emergency information is described. The system includes a processor receiving information from a plurality of stations, the processor determining whether any of the plurality of stations is in a connected state, the processor, when it is determined that a first one of the stations is in a connected state, generating, a secondary Warning Notification formatted for transmission over a dedicated control channel (DCCH). The system further includes an output device transmitting the secondary Warning Notification to the first station over the DCCH.

In another exemplary embodiment, a station for receiving emergency notifications is disclosed. The station includes a receiver configured to receive a primary Warning Notification and a processor which, upon receiving the emergency alert configuration in a format of one of a Paging Type 2 message and an SICI message, despreads a plurality of fingers.

In another exemplary embodiment, a non-transitory computer readable storage means including instructions is described. The instructions, when executed by a processor, cause the processor to perform operations including determining whether any of a plurality of stations to which a secondary Warning Notification is to transmitted is in a connected state, when it is determined that a first one of the stations is in a connected state, generating a primary Warning Notification formatted for transmission over a dedicated control channel (DCCH) and transmitting the primary Warning Notification to the first station over the DCCH.

DETAILED DESCRIPTION

Figure 1:
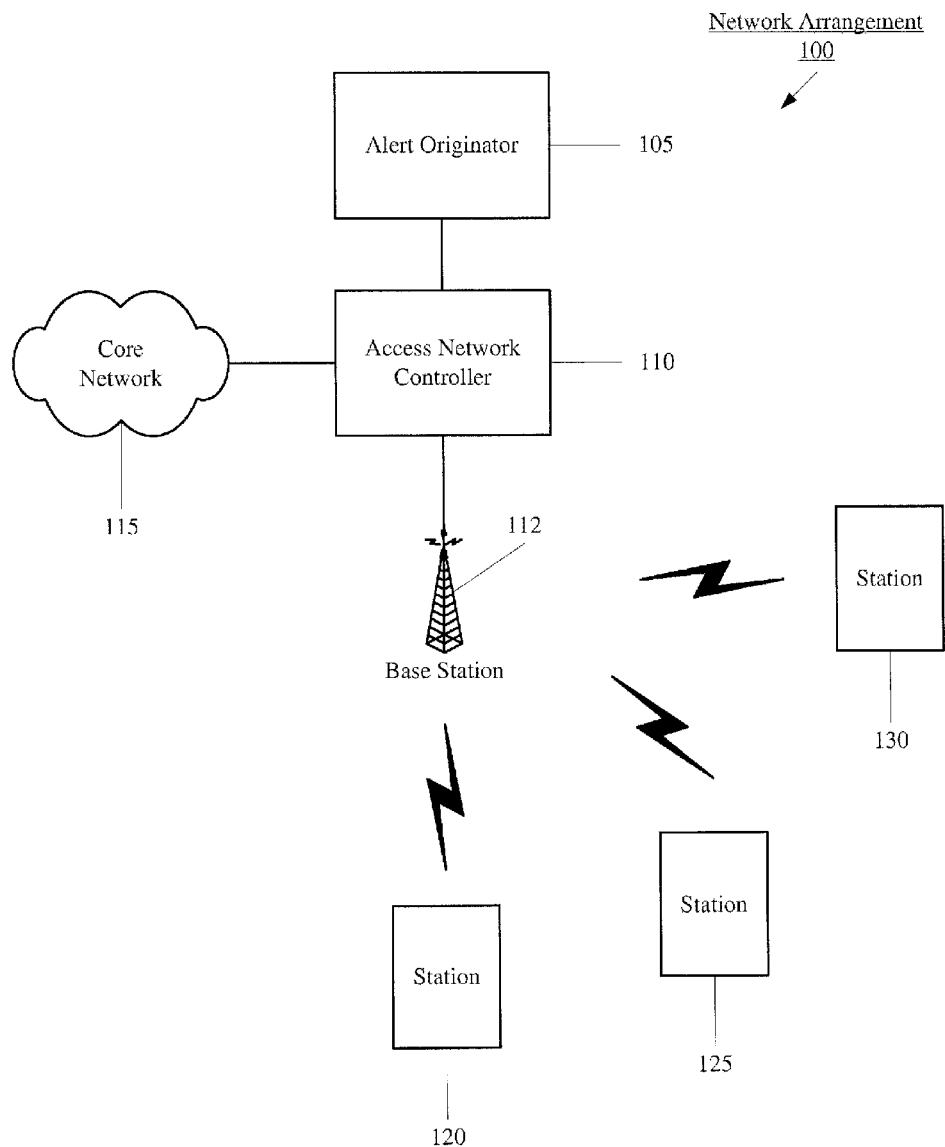
FIG. 1 shows an exemplary network arrangement to broadcast an Warning Notification to a plurality of stations.

The exemplary embodiments may be further understood with reference to the following description and the related appended drawings, wherein like elements are provided with the same reference numerals. The exemplary embodiments are related to a system and method for broadcasting an Warning Notification to at least one station that is in a connected state. Specifically, a broadcaster of the Warning Notification may transmit the Warning Notification to the connected state stations using a predetermined manner of broadcasting. In a first mode of broadcast, the broadcaster may be configured to provide an Warning Notification without modifying the manner in which the station operates. In a second mode of broadcast, the broadcaster and the station may be configured to utilize a primary Warning Notification enabling the station to alter the manner in which it operates to retrieve the Warning Notification. In a third mode of broadcast, the station may be configured to receive the Warning Notification without modifying the manner in which the broadcaster provides the Warning Notification. The Warning Notification, the broadcast thereof, the modes of broadcast, the Warning Notification, related signal diagrams, and related methods will be described in further detail below.

As used herein the term Warning Notification is information notifying users of the imminent occurrence of certain events and may include additional information such as instructions as to what to do, where to get help during the events, etc. The Warning Notification may be a Primary Notification (e.g., an abbreviated message sent in a manner to ensure delivery to a maximum number of target devices) and a Secondary Notification (a more detailed message that may, under certain conditions described below, be received by only a subset of target devices). The term Commercial Mobile Alert System (CMAS) means a public warning system that delivers Warning Notifications provided by Warning Notification Providers to CMAS capable Public Warning System User Equipment (PWS-UEs—defined below). CMAS defines three different classes of Warning Notifications—(Presidential, Imminent Threat and Child Abduction Emergency). PWS-UEs are devices that have the capability of receiving Warning Notifications within a Notification Area (defined below) through, for example, the 3GPP network. PWS-UEs conform to the behavior specific to the PWS service such as providing dedicated alerting indications and displaying Warning Notifications upon request. The term Earthquake and Tsunami Warning System means a Public Warning System that delivers Warning Notifications specific to earthquakes and tsunamis provided by Warning Notification Providers to the PWS-UEs within a Notification Area through, for example, the 3GPP network. The Notification Area is an area to which a Warning Notification is broadcast. This is generally an area corresponding to geographical information provided by the Warning Notification Provider.

An secondary Warning Notification may be transmitted from a broadcaster of the alert to a plurality of stations. For example, the broadcaster may utilize an eNodeB in a Long Term Evolution (LTE) network to broadcast the secondary Warning Notification. Emergency alert broadcast systems (EABS) have been established for this functionality. For example, in North America, the Commercial Mobile Alert System (CMAS) provides this broadcast; in Japan, the Earthquake and Tsunami Warning System (TWAS) provides this broadcast; in Europe, the EU-Alert provides this broadcast; in Korea, the Korean Public Alert System (KPAS) provides this broadcast; etc. These EABS use cell broadcast service (CBS) to provide the stations with the secondary Warning Notification. Specifically, the secondary Warning Notification is broadcast over a common traffic channel (CTC). However, in certain situations, the CBS manner of providing the secondary Warning Notification may not enable the station to receive the secondary Warning Notification. For example, under 3GPP specifications, the station listens for CBS messages on a common traffic channel (CTCH) only when the station is in a lower power state and doing nothing other than listening for a page. Therefore, a user in a voice call, in a data call, or in an otherwise connected state is incapable of receiving the CBS message in a Universal Mobile Telecommunications System (UMTS).

The station may be in the connected state in UMTS such as using a dedicated channel (Cell_DCH) or using a forward access channel (Cell_FACH) for a variety of reasons. For example, the user may be aware that the station is in the connected state when actively utilizing a wireless connection established with a wireless communications network (e.g., executing a browser application to surf the Internet, participating in a voice or data call, etc.). In another example, the user may be unaware that the station is in the connected state but assumes the station is in an idle state without realizing that background data activity is being performed that does not require user intervention (e.g., background notifications, mail-fetch, etc.). Under this connected state (with or without the user's knowledge), the CBS messages are not generally received.

It should be noted that depending on the specification utilized for the EABS, secondary Warning Notifications may still be received by the stations. In the above noted examples, the specifications for CMAS, EU-Alert, and KPAS do not allow for any secondary Warning Notifications to be received by any station when the station is in the connected state. Under the specification for ETWS, such a station may still receive a secondary Warning Notification broadcast as a primary notification. However, a secondary notification (which still has significant importance) may not be received by stations in the connected state. Therefore, the exemplary modes of broadcasting relate to providing secondary Warning Notifications to stations in the connected state that are otherwise incapable of receiving such alerts.

FIG. 1 shows an exemplary network arrangement 100 to broadcast a secondary Warning Notification to a plurality of stations. The network arrangement 100 related to broadcasting an secondary Warning Notification may include a variety of components. As illustrated, the network arrangement 100 includes an alert originator 105, an access network controller 110, a base station 112, and a core network 115 in which a communication may be transmitted therebetween. The network arrangement 100 may also relate to broadcasting the secondary Warning Notification to a plurality of stations 120, 125, 130. The stations 120, 125, 130 are within broadcast range of the base station 112 (e.g., from the broadcaster of the secondary Warning Notification).

The alert originator 105 may be an entity that determines when an secondary Warning Notification is required to be broadcast. For example, the alert originator 105 may be a government or administrative body that empowered to make this determination. The alert originator 105 may further be configured to broadcast the secondary Warning Notification to the stations 120, 125, 130. The access network controller 110 may be an entity that provides cellular coverage to the stations 120, 125, 130. Therefore, communications to the stations 120, 125, 130 may be routed via the access network controller 110, specifically the secondary Warning Notification received from the alert originator 105. Under CMAS, cell providers such as the access network controller 110 are requested to participate in the broadcast of secondary Warning Notifications to their customers via the corresponding stations associated with the customers.

The stations 120, 125, 130 may represent any electronic devices configured to receive the secondary Warning Notification according to the broadcast modes described herein. For example, any of the stations 120, 125, 130 may be a portable device such as a phone, a smartphone, a tablet, a phablet, a laptop, etc. The stations 120, 125, 130 may include a variety of components that may be used in receiving secondary Warning Notifications according to the broadcast modes described herein. For example, each of the stations 120, 125, 130 may include a processor, a memory arrangement, a transceiver, etc. Each of the stations 120, 125, 130 may execute an EABS application to properly receive and show the alert to the user on a display device thereof as would be understood by those skilled in the art.

The stations 120, 125, 130 may also include the Open Systems Interconnection (OSI) model indicative of a conceptual model characterizing the internal functions of the communication system through partitioning into a plurality of layers. For example, the stations 120, 125, 130 may include (in ascending order) a physical layer (PHY), a radio link control (RLC)/Media Access Control (MAC) layer, a radio resource control (RRC) layer, and a broadcast/multicast control (BMC) layer. Other layers that may be utilized for the exemplary broadcast of secondary Warning Notifications include the primary common control physical channel (PCCPCH), the secondary common control physical channel (SCCPCH), the CTCH, the broadcast control channel (BCCH), the dedicated physical data channel (DPDCH), and the dedicated physical control channel (DPDCH). The RRC layer may indicate an idle mode and a connected state. The idle mode has a minimal power consumption in which no operations are performed (except listening for pages). The connected state may include (in descending order of power consumption) Cell_DCH and Cell_FACH. It is noted that the idle state may also include Cell_PCH (cell paging channel), and URA_PCH (UMTS Terrestrial Radio Access Network (UTRAN) Registration Area cell paging channel).

It should be noted that the network arrangement 100 is illustrated for exemplary purposes only. Those skilled in the art will understand that there may be any number of alert originators, any number of access network controllers, any number of base stations, any number of networks, and any number of stations. For example, the access network controller 110 may be for a first cellular network associated with a first set of stations; a further access network controller may be for a second cellular network associated with a second set of stations; etc. In another example, the alert originator 105 may be for a first type of secondary Warning Notification; a further alert originator may be for a second type of secondary Warning Notification; etc.

The exemplary broadcast modes for broadcasting the secondary Warning Notification may be performed in a variety of manners. In a first broadcast mode, the broadcaster (e.g., the alert originator 105) is adapted to transmit the secondary Warning Notification to the stations 120, 125, 130 while the stations 120, 125, 130 only require already existing configurations. In a second broadcast mode, the broadcaster broadcasts the secondary Warning Notification using already existing manners but may also be adapted to utilize a primary Warning Notification. The stations 120, 125, 130 may be adapted to receive the primary Warning Notification to become aware that the Warning Notification exists and subsequently receive the broadcast of the secondary Warning Notification over CTCH. In a third broadcast mode, the broadcaster broadcasts the secondary Warning Notification using already existing manners while the stations 120, 125, 130 may be adapted to autonomously monitor and receive the broadcast secondary Warning Notification.

Figure 2:
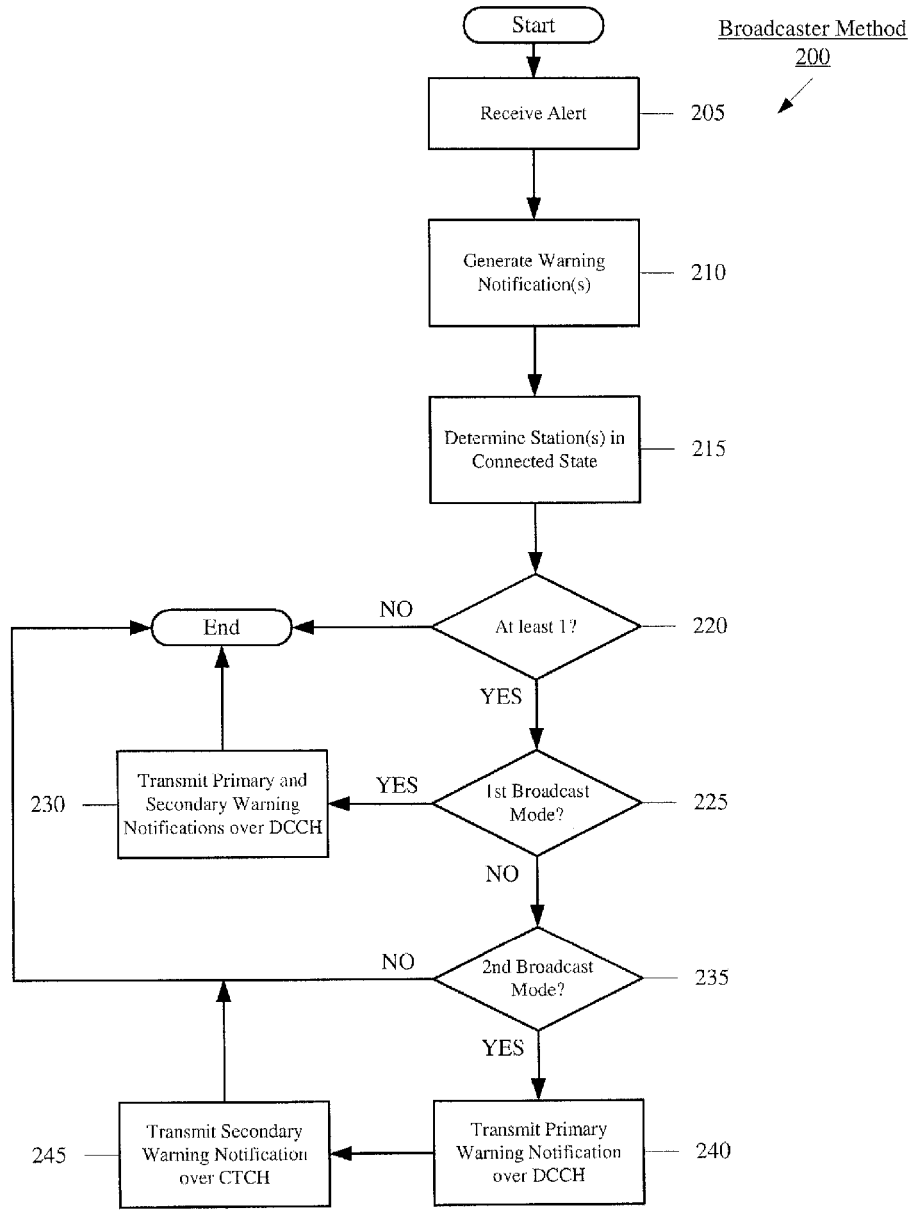
FIG. 2 shows an exemplary method for broadcasting an Warning Notification.

FIG. 2 shows an exemplary method 200 for broadcasting an secondary Warning Notification. The method 200 may incorporate all the broadcast modes listed above and described in turn. The method 200 will be described with regard to the network arrangement 100 of FIG. 1. It should be noted that the stations 120, 125, 130 may or may not be in a state that allows them to receive the secondary Warning Notification over CTCH using conventional means.

In step 205, the secondary Warning Notification may be received by the access network controller 110 from the alert originator 105. As described above, the alert originator 105 may provide alert information used to generate the secondary Warning Notification.

In step 210, the broadcaster (e.g., the access network controller 110) generates a secondary Warning Notification and primary Warning Notification. The primary Warning Notification and the secondary Warning Notification may have a format that depends on the type of EABS, the type of communication system being utilized by the broadcaster and the stations 120, 125, 130, and/or the broadcast mode being utilized.

In step 215, a determination is made whether at least one of the stations 120-130 is in the connected state. As discussed above, the connected state of the stations 120-130 may be determined based upon information concerning a variety of factors such as applications being executed on the stations 120-130. If no stations are found to be in the connected state, the method 200 ends. Specifically, the secondary Warning Notification is broadcast over the CTCH, as the stations 120-130 are capable of receiving the Warning Notification over the CTCH since they are not in the connected state that would otherwise prevent them from performing this functionality. However, if at least one of the stations 120-130 is in the connected state, the method 200 continues to step 225.

In step 225, a determination is made as to whether the first broadcast mode is to be used. As described above, in the first broadcast mode, the broadcaster is adapted to transmit the Warning Notification to the stations 120, 125, 130 while the stations 120, 125, 130 require only already existing configurations. If the first broadcast mode is used, the method 200 continues to step 230. In step 230, the broadcaster transmits the primary Warning Notification and the secondary Warning Notification over a dedicated control channel (DCCH). That is, the first broadcast mode relates to transmitting a complete secondary Warning Notification to the stations 120, 125, 130 in the UMTS connected state. Using the DCCH (e.g., signaling radio bearer 2), the broadcaster may transmit the secondary Warning Notification over the DCCH regardless of whether the stations 120, 125, 130 are in a connected state. For example, the broadcaster may generate the secondary Warning Notification as a short message service (SMS) message (in step 210) that is always received by the stations 120, 125, 130 even in the connected state. In this manner, the stations 120, 125, 130 do not require any modification to receive the secondary Warning Notification while the broadcaster need only be configured to transmit the secondary Warning Notification. Therefore, there is no concern that the stations 120, 125, 130 will not receive the secondary Warning Notification or will not read idle mode CBS messages (which is the standard format of broadcasting the Warning Notification).

It should be noted that even under the first broadcast mode, the broadcaster may still broadcast the secondary Warning Notification as the idle mode CBS message. For example, there may be further stations in the network arrangement 100 that are in the specified state (low power consumption, idle state) to receive the secondary Warning Notification.

Returning to step 225, if the first broadcast mode is not the only method to be utilized, the method 200 continues to step 235. That is, at least one of the second and third broadcast modes is utilized. If the third broadcast mode is used, the method 200 ends. That is, the secondary Warning Notification is broadcast as an idle mode CBS message or the secondary Warning Notification is broadcast over CTCH. As will be described in further detail below, the second and third broadcast modes utilize the standard format of broadcasting the secondary Warning Notification with a respective modification.

If the second broadcast mode is used, the method 200 continues to step 240. As described above, in the second broadcast mode, the broadcaster is configured to broadcast the secondary Warning Notification using already existing manners (as an idle mode CBS message) but may also be adapted to utilize primary Warning Notification. The stations 120, 125, 130 may be adapted to receive the primary Warning Notification to become aware that an emergency alert exists and subsequently configure themselves to receive the broadcast of the secondary Warning Notification.

In step 240, the broadcaster transmits the primary Warning Notification over DCCH. The may be an indicator that notifies, as an idle mode CBS message, the stations 120, 125, 130 that there is a secondary Warning Notification being broadcast. In this manner, both the broadcaster and the stations 120, 125, 130 may then be modified to broadcast and receive, respectively, the secondary Warning Notification. In step 245, the secondary Warning Notification is broadcast over CTCH since the primary Warning Notification indicates that the secondary Warning Notification is available over CTCH.

The primary Warning Notification may be transmitted as a signaling message to the stations 120, 125, 130. For example, the primary Warning Notification may be appended to a Paging Type 2 message. Those skilled in the art will understand that Paging Type 2 messages are used to page a station in a connected state (e.g., Cell_DCH or Cell_FACH) when using the DCCH for core network originated paging. Therefore, in the connected state and with an already existing signaling connection being established, dedicated paging information is transmitted to the station via this connection (instead of the paging channel). The primary Warning Notification may be appended to the dedicated paging information transmitted to the station. In another example, the primary Warning Notification may be appended to a System Information Change Indication (SICI) message. In a manner substantially similar manner to the Paging Type 2, when the cell provider has a change, the station receives the SICI message. Thus, with the cell provider 110 already transmitting the SICI message, the emergency alert notification may also be transmitted to the station through appending to the SICI message.

It should be noted that a Paging Type 1 message is used to page a station in an idle state (i.e., not in the connected state) using a paging channel. That is, the idle mode CBS message may be broadcast as a Paging Type 1 message when standard broadcasting modes are used (such as in the second and third broadcast modes).

It should also be noted that in the CMAS, ETWS, EU-Alert, and KPAS EABS, there is no emergency alert information (e.g., a notification of the alert) provided with the Paging Type 2 messages. It should also be noted that in the CMAS, EU-Alert, and KPAS EABS, there is also no emergency alert information provided with the SICI message. However, as discussed above, in the ETWS EABS, emergency alert information is provided in the SICI message when it is a primary notification. That is, the primary notification of the emergency alert is received by the station in the connected state. However, the secondary notification of the ETWS EABS is still not received. Therefore, the exemplary broadcast modes relate to broadcasting of the secondary notifications in the ETWS EABS.

Figure 3:
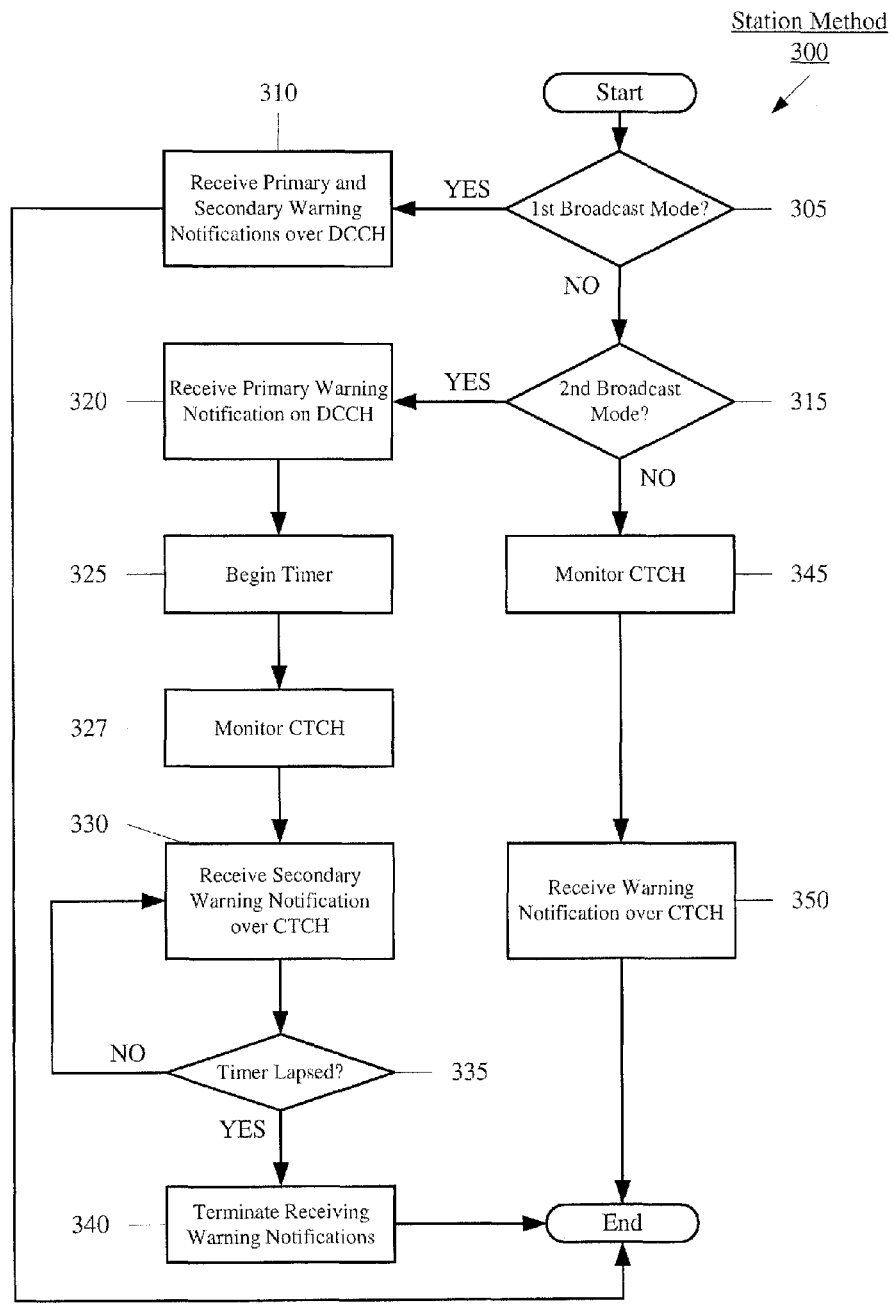
FIG. 3 shows an exemplary method for receiving the Warning Notification.

FIG. 3 shows an exemplary method 300 for receiving secondary Warning Notifications. The method 300 incorporates, for example, all of the broadcast modes listed above and described in turn. The method 300 will be described with regard to the network arrangement 100 of FIG. 1. It should be noted that the stations 120, 125, 130 may or may not be in a state that allows them to receive the secondary Warning Notification over CTCH using conventional means.

In step 305, each station (e.g., station 120, 125, 130) determines whether the first broadcast mode is being utilized. If the first broadcast mode is being used, the method 300 continues to step 310. In step 310, the station receives the primary Warning Notification and the complete secondary Warning Notification over DCCH such as an SMS message. It is again noted that since the secondary Warning Notification is transmitted over DCCH, the station is capable of receiving it despite being in the connected state and without any modification to already existing configurations.

Returning to step 305, if the first broadcast mode is not being used, the method 300 continues to step 315. In step 315, the station determines whether the second broadcast mode is being utilized. If the second broadcast mode is being used, the method 300 continues to step 320. In step 320, the station receives a primary Warning Notification over DCCH such as an appendix to a Paging Type 2 message or an SICI message. The EABS application of the station may be configured to determine that the primary Warning Notification has been received from processing the Paging Type 2 message or the SICI message.

When the station becomes aware of the primary Warning Notification, in step 325, the station initiates a timer. The primary Warning Notification invokes the station to perform a process to receive the idle mode CBS message being broadcast by the broadcaster. However, the station may be configured to terminate this process upon being invoked, to, for example, conserve battery power. A length of the timer may be set according to a variety of criteria. For example, the length of the timer may be set manually by the user or an administrator. In another example, the length of the timer may be set based upon a cycle of receiving network information such as in the LTE specification. In the LTE specification, a discontinuous reception (DRX) cycle may be utilized to conserve battery power. During the DRX cycle, network information may be exchanged at set, known times. Therefore, the length of the timer may be based thereupon. When the DRX cycle is based on a DRX-Level-1 specification, a first length of time representing an entire cycle (e.g., 30 minutes) may be used. When the DRX cycle is based on a DRX-level-2 specification, a second length of time representing an entire cycle (e.g., 2 minutes) may be used.

Once the timer has been initiated, the method 300 continues to step 327. In step 327, the station monitors the CTCH to receive the secondary Warning Notification corresponding to the primary Warning Notification. In step 330, the station receives the secondary Warning Notification that is broadcast as an idle mode CBS message over CTCH. The manner in which the station is capable of performing this process in the connected state will be described in further detail below with regard to FIGS. 4-6. In step 335, the station determines whether the timer has lapsed. If the timer has not lapsed, the method 300 returns to step 330. If the timer has lapsed, the method 300 continues to step 340 in which the station terminates the receiving of secondary Warning Notifications over CTCH.

Returning to step 315, if the first and the second broadcast modes are not used, the method 300 continues to step 345 in which the third broadcast mode is used. In step 345, the station monitors the CTCH such that in step 350, the station receives any secondary Warning Notification broadcast as an idle mode CBS message. This step may be substantially similar to step 330. Thus, step 350 will also be described in further detail below with regard to FIGS. 4-6.

The third broadcast mode on the station side may also utilize a timer aspect. The monitoring of the CTCH may be performed in a variety of manners. In a first example, the station monitors the CTCH in a continuous manner. In a second example, if the station utilizes the DRX-level-1, the monitoring is performed using the first length of time discussed above. In a third example, if the station utilizes the DRX-level-2, the monitoring is performed using the second length of time discussed above.

It should be noted that when the third broadcast mode is utilized, the station may be configured to receive only Warning Notifications broadcast in the CTCH as CBS messages. Those skilled in the art will understand that cell providers or other broadcasting entities may utilize the CTCH to also broadcast telemarketing services or advertisements as CBS messages which do not constitute Warning Notifications. Accordingly, when using the third broadcast mode, the station may restrict the monitoring of the CTCH to receive only specific services such as Warning Notifications while in the connected state. For example, all Warning Notifications may include headers with an indicator that the EABS application may use to determine that the CBS message is a Warning Notification. In another example, the EABS application may include an intelligence process that may determine whether the CBS message is a Warning Notification by deciphering words in the message.

As described above, the first broadcast mode does not require modification to the stations 120, 125, 130 to enable them to receive Warning Notifications transmitted over DCCH. The second and third broadcast modes utilize a modified process to receive the Warning Notification (e.g., steps 330, 350 of FIG. 3). In the second broadcast mode, upon receiving the primary Warning Notification, the station may be instructed to modify it's mode of operation to receive the secondary Warning Notification while in the third broadcast mode, the station may monitor the CTCH to receive the secondary Warning Notification. The manner in which the station receives the Warning Notification in the connected state (whether it is aware using the second broadcast mode or unaware using the third broadcast mode) will be described below with regard to FIGS. 4-6 in which FIGS. 4 and 5 relate to the connected state of Cell_DCH while FIG. 6 relates to the connected state of Cell_FACH.

Figure 4:
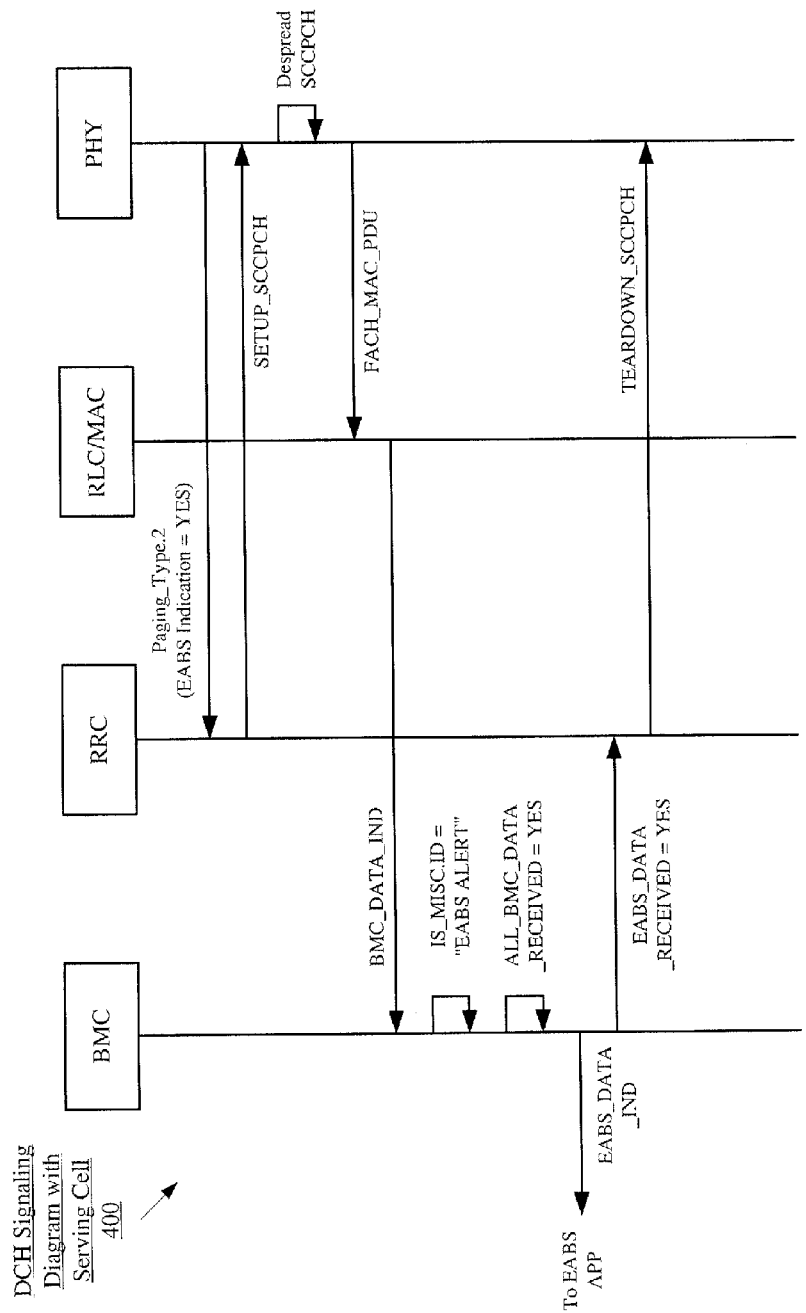
FIG. 4 shows an exemplary signaling diagram with a serving cell when a station is operating under Cell_DCH.

FIG. 4 shows an exemplary signaling diagram 400 with a serving cell when a station is operating under CELL_DCH. The signaling diagram 400 utilizes different layers for forwarding of signals therebetween. As illustrated, the signaling diagram 400 shows the PHY, the RLC/MAC, the RRC, and the BMS in which signals are forwarded between them as well as signals being forwarded to the EABS application. Initially, it is noted that the SCCPCH information (e.g., spreading code, timing offset, etc.) as well as the DRX cycle period (e.g., DRX-Level-1, DRX-Level-2, etc.) is known by the station and the EABS application from the cell system information (e.g., SIB5).

When the station is in the connected state using Cell_DCH, the station may assign a de-spreader for the SCCPCH for each assigned finger. The despreader includes a SCCPCH orthogonal variable spreading factor (OVSF) code and its timing offset, which is again noted as being known. A finger may correspond to one unique path seen by a rake receiver. For example, the finger may receive data from a first cell provider such as one associated with a serving cell. The finger may provide a unique path to a descrambling module corresponding to different layers such as PCCPCH, SCCPCH, DPDCH, and DPCCH. Furthermore, multiple fingers may be used in a mobile environment such as when multipaths exist. Thus, these further fingers may also receive data from the first cell provider and provide a unique path to the descrambling modules corresponding to the different layers.

When the second broadcast mode is used, the station may perform a SCCPCH despreading on each finger (e.g., continuously or depending on the DRX cycle period) once the primary Warning Notification has been received (e.g., in the Paging Type 2 message or the SICI message). When the third broadcast mode is used, the station may perform the SCCPCH despreading on each finger (e.g., continuously or depending on the DRX cycle period) once the station is in the Cell_DCH connected state. The timing to perform the SCCHPCH despreading under the third broadcast mode may depend on an implementation of the station and rake architecture. For example, if the DRX cycle is sufficiently short (e.g., 40 ms, 20 ms, etc.), then the station may perform the SCCPCH despreading continuously as the enabling/disabling of the despreading operation may include a delay of a similar time interval.

It should be noted that if the station is in a compressed mode and measuring neighbor frequencies, the station may be configured to not perform the SCCPCH despreading process on the fingers. Thus, if the station misses a Warning Notification broadcast as an idle mode CBS message using the Paging Type 1 message due to the station, for example, being in the compressed mode, the Warning Notification may not be received and subsequently read. The station may perform the SCCPCH despreading process once it is capable of reading the SCCPCH in a subsequent DRX cycle.

As illustrated in the signaling diagram 400, a message (Paging_Type.2 (EABS Indication=YES)) may be forwarded from the PHY to the RRC that a Paging Type 2 message has been received in which the primary Warning Notification is received from the broadcaster. This relates to when the second broadcast mode is being used. Thus, a message (SETUP_SCCPCH) may be forwarded from the RRC to the PHY to prepare for performing the SCCPCH despreading. When the third broadcast mode is being used, the paging message from the PHY to the RRC may be omitted. Instead, when the station enters the Cell_DCH connected state, the message (SETUP_SCCPCH) may be forwarded from the RRC to the PHY. Subsequently, the SCCPCH despreading process may be performed on the PHY.

It should be noted that the serving cell may decide to change the SCCPCH channel configuration at any time including the spreading factor, the spreading code, the time offset, the number of SCCPCHs, the presence of the CTCH on the channel, etc. However, the serving cell indicates these changes in the SIB5. Therefore, the station monitors the BCCH regularly. For example, the station may despread the PCCPCH on fingers at predetermined intervals and decode the manufacturer information block (MIB) on the BCCH in a manner substantially similar to the SCCPCH. If a new MIB value tag is different from an existing value tag, the station may read the SIBs until the SIB5 is read (as per 3GPP 25.331). In the case of a SCCPCH configuration change, the station may reconfigure its SCCPCH despreading on the same cell provider.

Upon performing the SCCPCH despreading, a message (FACH_MAC_PDU where PDU is a protocol data unit) may be forwarded from the PHY to the RLC/MAC. The MAC may decode the FACH blocks used in the DCH connected state determined from the SCCPCH despreading process. Upon decoding, the MAC may send only the CTCH RLC PDUs to the RLC, which forwards a corresponding message (BMC_DATA_IND) from the RLC/MAC to the BMC. Once at the BMC, this layer determines the identity of the emergency alert (IS_MISC.ID="EABS ALERT") as well as determining whether the entire emergency alert has been received (ALL_BMC_DATA_RECEIVED=YES). Subsequently, the data corresponding to the emergency alert itself (EABS_DATA_IND) is forwarded to the EABS application for decoding and displaying on the station. After the data has been forwarded to the EABS application, a message (EABS_DATA_RECEIVED=YES) may be forwarded from the BMC to the RRC that triggers a teardown process by forwarding a message (TEARDOWN_SCCPCH) from the RRC to the PHY.

Figure 5:
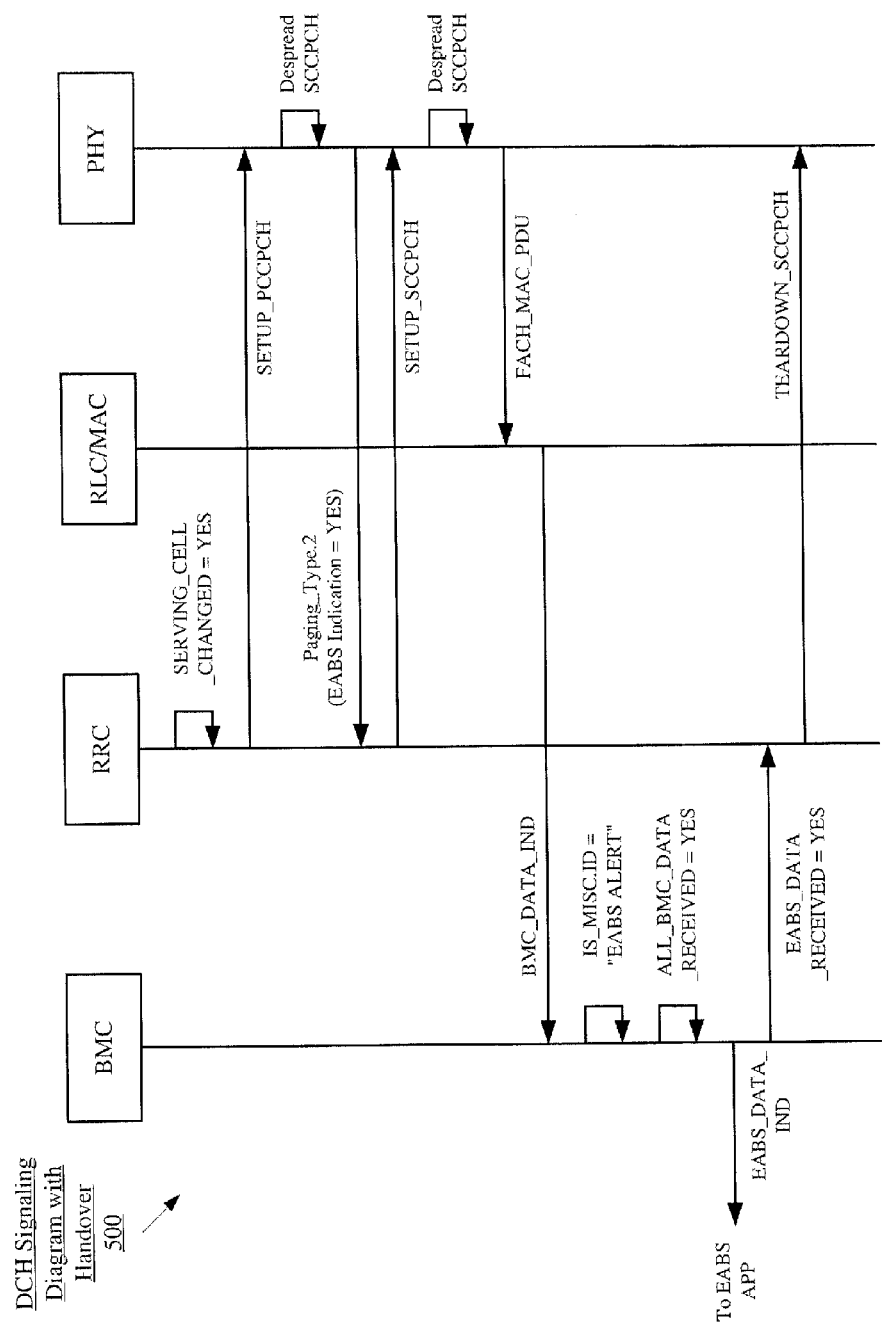
FIG. 5 shows an exemplary signaling diagram with a handover when a station is operating under Cell_DCH.

FIG. 5 shows an exemplary signaling diagram 500 with a handover when a station is operating under CELL_DCH. The signaling diagram 500 may include message forwarding between the layers substantially similar to the message forwarding between the layers of the diagram 400. Specifically, beginning with the message (Paging_Type.2 (EABS Indication=YES)) forwarded from the PHY to the RRC, the message forwarding may be the same as the signaling diagram 400. However, the signaling diagram 500 also includes message forwarding when a handover is performed such as a hard handover or a soft/softer handover.

In a hard handover scenario, the station moves from a first serving cell to a second serving cell. After the station moves to the second serving cell, the station initially reads the SIB5 and determines the SCCPCH configuration. Subsequently, the SCCPCH despreading process of descrambling the SCCPCH may be performed. It is noted that the overall delay in reading the CRCH in a new cell from a hard handover may vary from a few milliseconds to a couple of seconds.

In a soft/softer handover scenario, the station is connected to both the first serving cell and the second serving cell. The station may not perform the SCCPCH despreading from multiple serving cells, as the BMC layer does not support multiple CTCHs under the 3GPP specification. Since Warning Notifications may vary from one serving cell to another, soft combining of multiple SCCPCHs from different serving cells may provide different CTCH PDUs. This may ultimately confuse the BMC layer so that the soft combining of the SCCPCH is prevented. However, the station may perform the SCCPCH despreading from the first serving cell until it is removed from the existing set of connected cells (i.e., active set). Once removed from the first serving cell and only associated with the second serving cell, the station may pick up a new best serving cell in the active set for SCCPCH despreading. Accordingly, the mechanism to perform the SCCPCH despreading may be substantially similar to the above described hard handover.

As illustrated in the signaling diagram 500, to accommodate the above handover processes, the RRC may determine that the serving cell has changed (SERVING_CELL_CHANGED=YES). If changed, a message (SETUP_PCCPCH) may be forwarded from the RRC to the PHY. Accordingly, the above noted manner of despreading the SCCPCH in the first serving cell may be performed on the PHY until the handover has been completed such as in the hard handover. Therefore, the SCCPCH despreading process may be performed in the second serving cell.

Figure 6:
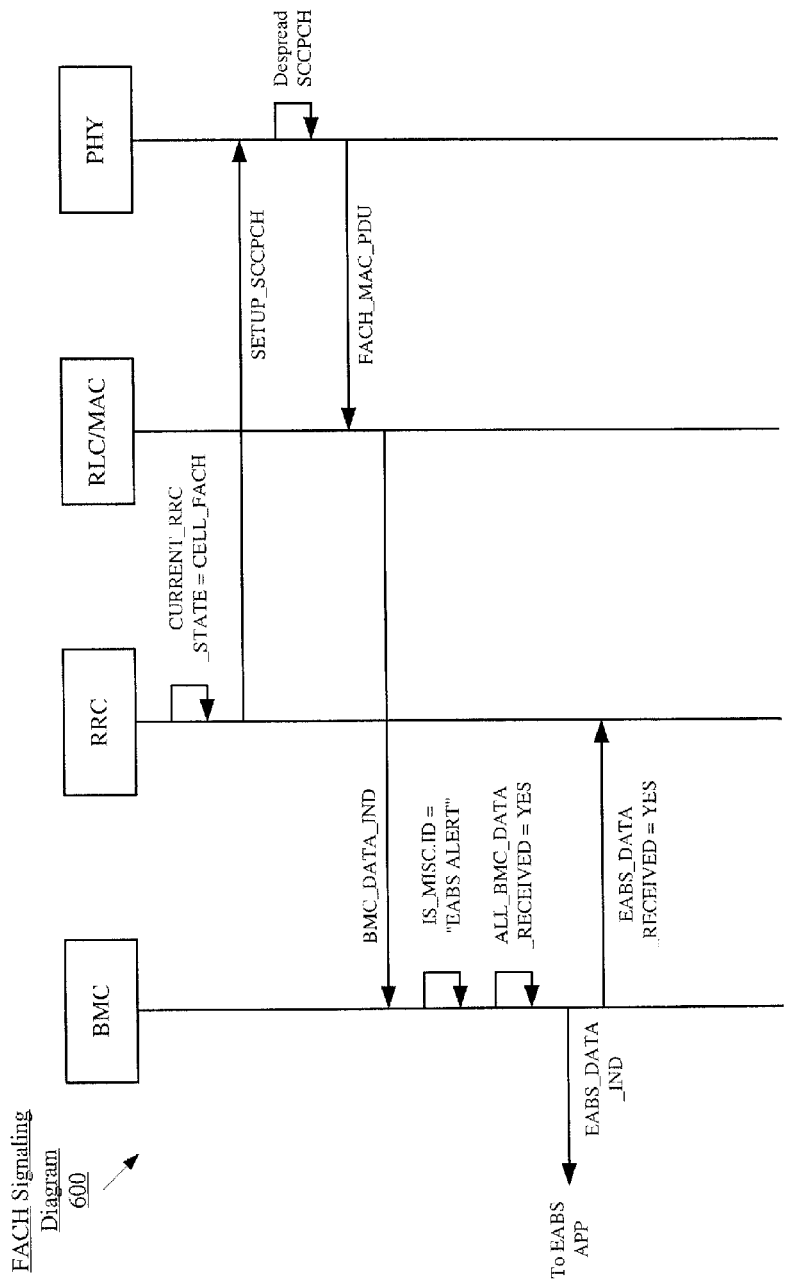
FIG. 6 shows an exemplary signaling diagram when a station is operating under Cell_FACH.

FIG. 6 shows an exemplary signaling diagram 600 when a station is operating under CELL_FACH. The signaling diagram 600 may utilize layers substantially similar to the layers shown in the signaling diagrams 400, 500. The signaling diagram 600 may also include message forwarding between the layers substantially similar to the message forwarding between the layers shown in the signaling diagram 400. Specifically, beginning with the message (SETUP_SCCPCH) forwarded from the RRC to the PHY, the message forwarding may be the same as the signaling diagram 400. However, the signaling diagram 600 relates to when the Cell_FACH connected state is in use. Therefore, the RRC first determines whether the connected state is Cell_FACH (CURRENT_RRC_STATE=CELL_FACH).

Those skilled in the art will understand that under the Cell_FACH connected state, the station allocates fingers to the SCCPCH and FACH transport blocks are decoded. The MAC layer may be modified to decode CTCH RLC PDUs in the Cell_FACH connected state since the MAC layer in the idle state already performs this functionality. Therefore, the decoding of the CTCH RLC PDUs in the Cell_FACH connected state may be an additional condition for the already existing functionality of the MAC layer. It is again noted that to decode the CTCH RLC PDUs, the MAC layer may follow the DRX cycle period defined in the SIB5 or may perform this functionality continuously.

The exemplary embodiments provide a system and method broadcasting a Warning Notification to a station that is in a connected state. In the connected state, a Warning Notification broadcast as an idle mode CBS message may not be received by a station in the connected state. Accordingly, the exemplary broadcast modes provide a manner to bypass this condition such that stations in the connected state are still capable of receiving Warning Notifications even when in the connected state. In a first broadcast mode, the broadcaster generates Warning Notifications to be transmitted to stations in the connected state over the DCCH, thereby mooting the fact that certain stations may be in the connected state. In a second broadcast mode, the broadcaster broadcasts the Warning Notification as an idle mode CBS message; the broadcaster may also determine whether a station is in the connected state and may transmit a primary Warning Notification to any station in the connected state to indicate that a secondary Warning Notification is being broadcast as an idle mode CBS message. In a third broadcast mode, the broadcaster may broadcast the Warning Notification as an idle mode CBS message while individual stations autonomously perform a process to receive the CBS message. Under the second and third broadcast modes, the one or more stations may be configured to perform a SCCPCH despreading process to receive the Warning Notification being broadcast as an idle mode CBS message even when these stations are in the connected state.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform, MAC OS, iOS, Android OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   determining whether any of a plurality of stations to which a Warning Notification is to be transmitted is in a connected state, wherein the connected state is indicated by a radio resource control (RRC) layer and comprises a station actively using a RRC connection established with a wireless communications network;
   when a first one of the stations is in the connected state, generating, by a broadcaster, a secondary Warning Notification formatted for transmission over a common traffic channel (CTCH);
   formatting, by the broadcaster, a primary Warning Notification for transmission over a dedicated control channel (DCCH) to the first station, the primary Warning Notification indicating that the secondary Warning Notification is being broadcast to enable the first station to alter its configuration to receive the secondary Warning Notification;
   transmitting, by the broadcaster, the primary Warning Notification to the first station over the DCCH; and
   transmitting, by the broadcaster, the secondary Warning Notification to the first station over the CTCH.

2. The method of claim 1, wherein the connected state includes one of a Cell_DCH state, a Cell_FACH state, accessing the internet, or executing a voice call.

3. The method of claim 1, wherein:

the primary Warning Notification instructs the first station to perform a secondary common control physical channel (SCCPCH) despreading process to receive the secondary Warning Notification.

4. The method of claim 3, comprising:
wherein the primary Warning Notification includes a Paging Type 2 message.

5. The method of claim 4, further comprising:
broadcasting, by the broadcaster, the secondary Warning Notification over the CTCH as an idle mode CBS message.

6. The method of claim 1, wherein the connected state comprises at least one application being executed on a station of the plurality of stations.

7. A system for transmitting emergency information, comprising:
a processor receiving information from a plurality of stations, the processor determining whether any of the plurality of stations is in a connected state, wherein the connected state is indicated by a radio resource control (RRC) layer and comprises a station actively using a RRC connection established with a wireless communications network;
the processor, when a first one of the stations is in the connected state, generating, a secondary Warning Notification formatted for transmission over a common traffic channel (CTCH);
the processor producing a primary Warning Notification including for transmission over a dedicated control channel (DCCH) to the first station, the primary Warning Notification indicating that the secondary Warning Notification is being broadcast over the CTCH to enable the first station to alter its configuration to receive the secondary Warning Notification; and
an output device transmitting the primary Warning Notification to the first station over the DCCH and the secondary Warning Notification to the first station over the CTCH.

8. The system of claim 7, further comprising a transmitter transmitting the secondary Warning Notification to stations determined not to be in the connected state via the CTCH.

9. A station for receiving emergency notifications, comprising:
wherein the station is in a connected state and the connected state is indicated by a radio resource control (RRC) layer and comprises the station actively using a RRC connection established with a wireless communications network;
a receiver configured to receive a primary Warning Notification;
a processor which, upon receiving the primary Warning Notification in a format of one of a Paging Type 2 message or an SICI message, despreads a plurality of fingers and alters a configuration of the station to receive a secondary Warning Notification, wherein the Paging Type 2 message comprises a message used to page the station in the connected state.

10. The station of claim 9, wherein the processor despreads the fingers when the station is in a Cell_DCH connected state.

11. The station of claim 9, wherein, when the station moves from a first serving cell to a second serving cell, the station initially reads an SIBS and determines a configuration of the SCCPCH.

12. The station of claim 11, wherein, after the station determines a configuration of the SCCPCH, the processor performs an SCCPCH despreading process to descramble the SCCPCH.

13. A non-transitory computer readable storage medium including instructions which, when executed by a processor, cause the processor to perform operations comprising:
determining whether any of a plurality of stations to which a secondary Warning Notification is to be transmitted is in a connected state, wherein the connected state is indicated by a radio resource control (RRC) layer and comprises a station actively using a RRC connection established with a wireless communications network;
when a first one of the stations is in the connected state, generating a secondary Warning Notification formatted for transmission over a common traffic channel (CTCH);
formatting, by the broadcaster, a primary Warning Notification for transmission over a dedicated control channel (DCCH) to the first station, the primary Warning Notification indicating that the secondary Warning Notification is being broadcast to enable the first station to alter its configuration to receive the secondary Warning Notification;
transmitting the primary Warning Notification to the first station over the DCCH; and
transmitting the secondary Warning Notification to the first station over the CTCH.

14. The storage medium of claim 13, wherein the connected state includes Cell_DCH and Cell_FACH states, accessing the internet, executing a voice call.

15. The storage medium of claim 13, wherein:
the primary Warning Notification instructs the first station to perform a secondary common control physical channel (SCCPCH) despreading process to receive the secondary Warning Notification.

16. The storage medium of claim 15, comprising:
wherein the primary Warning Notification includes a Paging Type 2 message.

17. The storage medium of claim 13, further comprising:
broadcasting, by the broadcaster, the secondary Warning Notification over the CTCH as an idle mode CBS message.

* * * * *

UNITED STATES PATENT AND TRADEMARK OFFICE
CERTIFICATE OF CORRECTION

PATENT NO. : 9,723,465 B2
APPLICATION NO. : 14/502843
DATED : August 1, 2017
INVENTOR(S) : Shukla et al.

Page 1 of 1

It is certified that error appears in the above-identified patent and that said Letters Patent is hereby corrected as shown below:

In the Claims

Claim 11, Column 14, Line 8:
"SIBS" should read "SIB5"

Signed and Sealed this
Tenth Day of April, 2018

Andrei Iancu
*Director of the United States Patent and Trademark Office*